United States Patent [19]

Sweeny

[11] 4,219,419
[45] Aug. 26, 1980

[54] TREATMENT OF REDUCIBLE HYDROCARBON CONTAINING AQUEOUS STREAM

[75] Inventor: Keith H. Sweeny, West Covina, Calif.

[73] Assignee: Envirogenics Systems Company, El Monte, Calif.

[21] Appl. No.: 942,336

[22] Filed: Sep. 14, 1978

Related U.S. Application Data

[63] Continuation-in-part of Ser. No. 780,849, Mar. 24, 1977, abandoned.

[51] Int. Cl.$^2$ .............................................. C02C 5/02
[52] U.S. Cl. .................................. 210/59; 210/96.1; 210/503
[58] Field of Search ................. 210/50, 59, 96 R, 503, 210/258, 266, 291, 293

[56] References Cited

U.S. PATENT DOCUMENTS

| | | | |
|---|---|---|---|
| 3,382,983 | 5/1968 | Stewart | 210/503 X |
| 3,470,104 | 9/1969 | Domas | 210/503 X |
| 3,575,853 | 4/1971 | Gaughan et al. | 210/50 X |
| 3,664,951 | 5/1972 | Armstrong | 210/96 R |
| 3,737,384 | 6/1973 | Sweeny et al. | 210/59 |
| 3,922,224 | 11/1975 | Lewardowski | 210/50 X |

Primary Examiner—Thomas G. Wyse
Attorney, Agent, or Firm—Poms, Smith, Lande & Rose

[57] ABSTRACT

A new, economical system for removal of persistant reducible organic compounds from aqueous streams by passing the stream, preferably at or near neutral pH, through a column containing a metal reductant catalyzed to provide efficient and economical reduction or dechlorination of a variety of pesticides and other compounds such as PCB or chloroform. The system is especially useful to reduce the level of soluble, reducible hydrocarbons in very dilute waste streams (1 ppm or less) generally by 99% or more.

19 Claims, 4 Drawing Figures

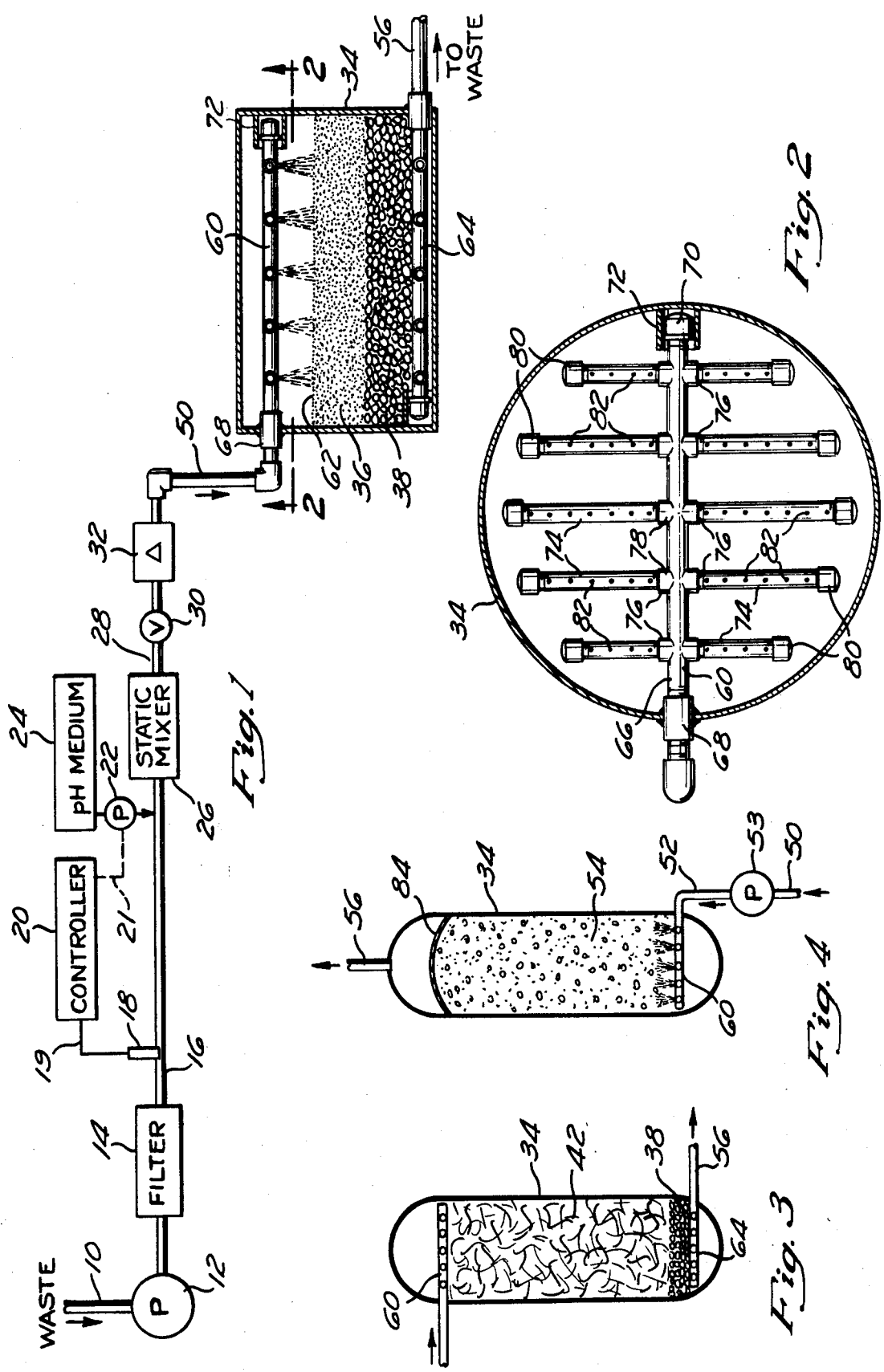

TREATMENT OF REDUCIBLE HYDROCARBON CONTAINING AQUEOUS STREAM

CROSS-REFERENCE TO RELATED APPLICATION

This application is a continuation-in-part of application Ser. No. 780,849 filed Mar. 24, 1977, now abandoned.

BACKGROUND OF THE INVENTION

1. Field of the Invention

The present invention relates to the detoxification of aqueous waste streams and, more particularly, to the degradation of reducible organic compounds in aqueous waste streams to provide effluents containing innocuous degradation products.

2. Description of the Prior Art

Many halogenated organic compounds such as those used for pesticides, herbicides, dielectric oils and flame retardants are very stable and consequently they accumulate in the environment. Some are toxic even at low levels while others are accumulated in organisms with concentrations increasing with the level in the food chain until higher animals may be rendered unfit for human consumption or may be toxic to higher species. Careful controls during the manufacture and utilization of such halogenated organic compounds have reduced their entry into the environment. However, these effluent streams still generally contain 1 ppm or less of halogenated toxicant which is at a level harmful to the environment. Furthermore, these streams are difficult to treat because of the low concentration of these extremely stable compounds. No cost effective means has been developed for removal of these materials from solution in aqueous waste streams necessarily generated during manufacture and use. Although the solubilities of such compounds in water are generally less than 1 ppm, this level is considered excessive for discharge.

It has recently been found that in addition to compounds of the more complex type mentioned above, low molecular weight halogenated hydrocarbons ("light ends" e.g. chloroform and similar halogenated compounds) appear in trace amounts in river systems. Certain of these compounds, presumably generated by the chlorination of municipal or industrial waste water, are suspected carcinogens.

Other reducible organic species are responsible for severe contamination, and are in some cases carcinogenic. Among the types of compounds recognized as requiring removal from waters are the nitros mines, phenols, nitrogen compounds and heterocyclics such as the s-triazines.

The reductive degradation of chlorinated hydrocarbons by means of metals or metallic couples has been disclosed in U.S. Pat. Nos. 3,640,821; 3,737,384; 3,767,782; 3,767,783; 3,871,906; and 3,873,346. Degradation of the chlorinated hydrocarbons and their consequent detoxification occurs as a result of removal of chlorine from the organic systems with the formation of metal chlorides. The latter patents relate to self-destructing pesticides in which the pesticide is adhered to a coated metal particle. The coating produces the acid medium (pH 1.5 to 4) preferred in all these patents. The earlier patents suggest the treatment of acidic aqueous streams with a slight stoichiometric excess of metal for effective reaction such as at least about 2:1 (weight basis about 0.5:1) the highest ratio being about 3.6:1 (1:1 weight basis).

The use of acidic conditions required in these prior patents to treat an aqueous waste stream is accompanied with an excess dissolution of the metal catalyst reductant which is costly and results in an excessive quantity of metal ions in the effluent stream, which, in itself would be unsatisfactory for discharge to the environment, even with iron, the least toxic metal employed.

SUMMARY OF THE INVENTION

An economical process for the treatment of aqueous waste streams containing low levels of reducible organic compounds is provided in accordance with the invention. The process is based on readily available, easily obtained, low cost reagents. The treated effluent contains a residual amount of the reduced organic compound at a level not harmful to the environment and meeting applicable U.S. Federal Standards for water quality. The major portion of the organic compound is decomposed to innocuous products and the treated effluent does not contain an excessive quantity of metal ions which further protects the environment and saves costly reagent. The invention further provides several modes of contacting the stream and reagent. This flexibility in process operation permits selection of the most efficient treatment for a particular waste stream. Several modes of degradation are known, based upon observed products of degradation.

a. Displacement of Cl with H

The reductive degradation of DDT with copper-catalyzed zinc leads largely to the removal of the three aliphatic chlorine atoms from the DDT.

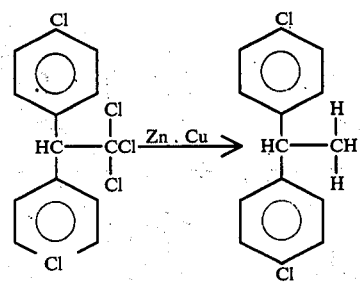

b. Saturation of double bonds and aromatic rings.

c. Hydrolysis

The reductive degradation of chlorobenzene in the reductive column with copper-catalyzed iron has led to cyclohexanol as an identified product. This degradation has resulted both in the saturation of the aromatic ring in the chlorobenzene, and in the substitution of hydroxyl for chlorine.

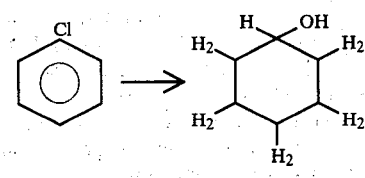

d. Ring-opening

Passage of dilute aqueous hexachorocyclopentadiene through a reductive column containing copper-catalyzed iron reductant has produced non-chlorinated branched-chain aliphatics as products, according to mass-spectral detection of the gas liquid chromatographic fractions of these samples.

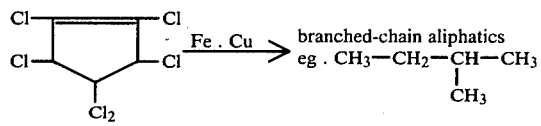

e. Rearrangement of Carbon Skeleton

The reduction of endrin and heptachlor with copper-catalyzed iron in the reduction column has produced a non-chlorinated product identified as 1-propylene bicyclo [3.2.1] octan-2-one.

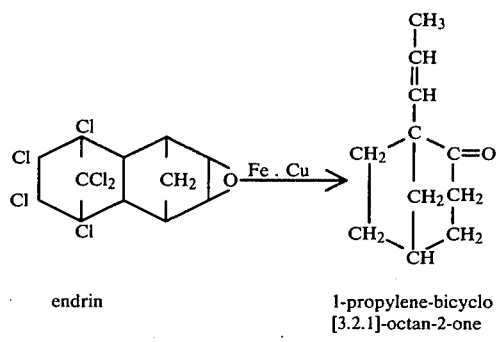

endrin           1-propylene-bicyclo [3.2.1]-octan-2-one f. Condensation

The reductive degradation of DDT by copper-catalyzed aluminum or iron leads largely to the condensation product 1,1,4,4-tetra-(p-chlorophenyl)-2,2,3,3- tetrachlorobutane.

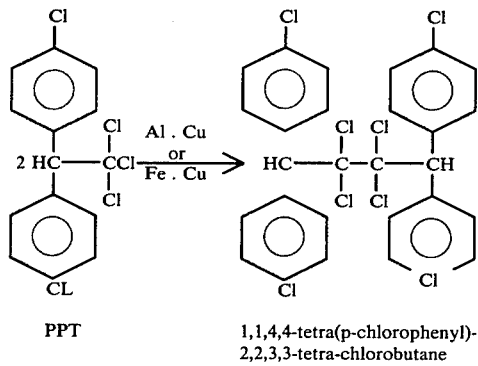

PPT           1,1,4,4-tetra(p-chlorophenyl)-2,2,3,3-tetra-chlorobutane g. Removal or Reduction of Functional Groups The reductive degradation of p-nitrophenol (Example 12) and N-Nitrosodimethylamine (Example 13) in dilute aqueous solution with copper-catalyzed iron has led to a product where the starting functional group is no longer present. With the nitrophenol, neither phenol nor aniline was present as a product, nor apparently amino phenol. Similarly with the dimethylnitrosamine (Example 13), the nitrosamine function was removed, and dimethylamine was not a product.

Dilute aqueous waste streams containing small amounts of dissolved, reducible organic compounds, usually less than 100 ppm and generally less than 1 ppm are treated in accordance with the invention by flowing the stream, preferably at neutral pH, through a constrained bed of reductant metal in which the ratio of metal reductant to compound is at least $10^3:1$ preferably $10^4:1$ to $10^6:1$. The reductant metal bed, preferably as a metal couple containing 0.1 to 10 meq catalyst/g of reductant may be in the form of a porous sponge or wire mass, a fluidized bed or a bed diluted with particulate inert solid such as glass beads or sand so as to have a selected permeability, flow rate and retention time. The effluent usually experiences a significant reduction in toxicant, usually at least a 90% reduction and can contain 1 ppb or less of the reducible organic compound. The waste treatment system generally includes filtration means, pH adjustment means, a flow controller and a column containing a restrained, permeable bed of reductant.

The system of the invention provides highly efficient and economical removal of reducible organics from difficult to treat, dilute manufacturing or processing waste water. Included among the variety of pesticides and other reducible organics amenable to reductive degradation by this invention are the cyclodiene pesticides aldrin, chlordane, dieldrin, endrin, heptachlor, heptachlor epoxide, and Kepone; DDT and related materials such as DDD, methoxychlor, Perthane, and Kelthane; the chlorinated camphene, toxaphene; the chlorinated phenoxyacetic acid herbicides, 2,4-D and 2,4,5-T; and the polychlorinated biphenyl (PCP) industrial materials (Aroclors). PCBs, non-biodegradable fluids used in a number of commercial applications, including manufacture of large electrical transformers and capacitors, have previously proven to be all but indestructible. The oily PCBs are believed to be hazardous to the environment and have been found in fish in dangerous concentrations in New York's Hudson River. Non-chlorinated organics amenable to reductive degradation include the nitrosamines, phenols, nitrocompounds and heterocyclics such as s-triazines.

Water treating equipment based on the invention has reduced the content of chlorinated pesticides endrin and heptachlor to less than one part per billion in laboratory and sub-pilot tests. This is well below 1978 federal standards. The chlorine makeup of endrin and heptachlor is similar to that of PCBs and laboratory and sub-pilot tests with PCBs have resulted in similar reductions when a 200 ppb Aroclor solution was passed through the column. A unit to treat chlorinated hydrocarbon pesticide manufacturing wastes at flow rates as high as 100 gpm is being tested in the field. Effluent levels as low as 0.01 ppb are being obtained from a waste stream containing up to 500 ppb of chlorinated pesticides. Treatment costs, to be confirmed in these tests, are estimated to be $0.41/1000 gal. and the amortized capitol investment to be $0.21/1000 gal. effluent, giving an estimated total cost (reagents, operator, maintenance and supplies, utilities and amortized capital investment) of $0.72/1000 gal. Even lower costs are projected for fluidized-bed reactors, with an estimated treatment cost for a 1 MGD treatment plant of $0.108/1000 gal. and amortized capital investment of $0.031/1000 gal., giving an estimated total cost (reagents, operator, maintenance and supplies, utilities and amortized capital (investment) of $0.139/1000 gal.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a schematic view of a water treatment system in accordance with this invention;

FIG. 2 is a sectional view taken on line 2—2 of FIG. 1;

FIG. 3 is a schematic view of an alternate reductant column incorporating a filamentary reductant; and FIG. 4 is a schematic view of a fluidized bed, reductant column.

DESCRIPTION OF THE PREFERRED EMBODIMENTS

Referring now to FIG. 1, the waste stream 10 is pumped through filter 14 by means of pump 12. The filter can be a cartridge, sand, activated carbon or other type, depending on the characteristics of the effluent being handled. Additional flow stream purifications such as oil removal can be practiced at this time, if necessary. The filtered stream 16 is sensed for pH by sensing element 18 as it flows to static mixer 26. Element 18 generates a signal 19 delivered to pH controller 20 which develops a metering signal 21 applied to pump 22 to inject the necessary amount of pH adjusting medium from tank 24 as required into the static mixer 26. The pH adjusted stream 28 is metered through valve 30 and flow meter 32 to a reductant column 34. Gravity feed is usually adequate though the system can be operated with small applied pressures of 5–15 psig. Flow rates up to about 4 gpm/square foot are commonly employed.

The column 34 contains a permeable bed 36 of reductant particles constrained within the column by permeable retaining means such as a permeable plate or a bed of rocks 38 which prevent passage of reductant particles through the outlet 56. The ratio of reductant to reducible organic materials is at least 1000:1 and preferably from $10^4$:1 to $10^6$:1. The column preferably contains a flow distribution system such as a perforated splash plate or a multiple spray manifold 60 for distributing the flow from inlet 50 over the top surface 62 of the bed 36 of reductant. The outlet end of the column also should contain a multiple collection system such as a perforated plate or manifold 64 to reduce the pressure drop to the outlet 56.

Referring now to FIG. 2, a more detailed structure for the distribution 60 and collection manifolds 64 is illustrated. The manifolds comprise a central conduit 66 supported across the wall of the column by being threadingly received into filling 68 and having capped end 70 engaged in support 72. A set of branch arms 74 are deployed from the central conduit having their inner threaded ends 76 received into fillings 78 and their outer ends closed by caps 80. Holes 82 are drilled into each arm 74 in a set diameter and pattern such as 3/16" diameter holes on two inch centers. The distribution manifold 60 is installed with the holes 82 facing downwardly and the collection manifold is installed with the holes 82 facing upwardly.

The reductant column may be totally comprised of finely divided reductant particles. However, the pressure drop through the bed is excessive and the particles tend to agglomerate. Therefore, it is preferred to form an intimate mixture of the reductant particles with solid inert particles such as sand or glass beads. The diameter of the inert particles are selected to provide a bed with good packing density and permeability, typically about 1 to 10 times the diameter of the reductant. The reductant has a diameter usually in the range of 5 to 500 micrometers, typically 50 to 250 micrometers metal powder. Commonly 5 to 40% of the reductant is utilized in the mix by weight.

The blend of reductant and diluent such as sand is adjusted so that the proper flow through the mass is achieved with adequate contact between the reductant and solution so that effective reaction takes place. The constrained bed of filler and reductant is found to give more complete reaction than those in which aqueous toxicant solutions are stirred with a suspension of a lesser amount of reductant. Furthermore, it is not feasible to carry out stirred reactions with the reductant to toxicant ratios practiced herein.

The reductant metal can be at least one metal such as zinc, aluminum, iron, magnesium, cadmium. However the faster reaction, more complete reaction and a decomposition product in which the proportion of relatively innocuous products is increased is provided by addition of from 0.1 to 10 meq/g of catalytic metals such as copper, silver, cobalt, nickel and the like. Preferred metal couples are copper and iron or aluminum from the standpoint of cost effectiveness and innocuous effluents, especially in the neutral pH reductive column. However, other couples such as iron-cobalt, iron-nickel, and iron-silver are approximately as effective as iron-copper. Other couples that can be utilized are zinc-copper, aluminum-copper, magnesium-copper, cadmium-copper.

The catalyzed metal reductant couples can be prepared by depositing, preferably by electrochemical displacement, a thin film or layer of the catalytic metal upon the metal reductant or they may be prepared in the form of an alloy. For example, the metal powder can be washed with dilute hydrochloric acid, rinsed with water, treated with a dilute 1–10% solution of a salt of the catalytic metal with a strong acid such as cupric sulfate, then washed with water and solvent and then dryed for future use or used immediately in the wet form. The metal catalytic couples can also be prepared by high temperature reduction of an oxide of the catalytic metal with the reductant metal using hydrogen as a reducing agent. The reaction mass in alloy form is then cooled, ground to a fine powder and dryed before use. Alloys can also be formed by directly melting the metals together followed by grinding and sizing.

The reductant can also be formed inside the column, for example iron powder dispersed in sand can be converted to effective reductant by pouring dilute solutions of salt to be electrochemically deposited through the column. For example, an iron-sand mixture was converted to an iron-copper couple-sand mixture by passing a dilute copper sulfate solution through the packed column and then washing out the formed iron salts and any remaining unreacted copper sulfate. This technique is advantageous both in simplifying the effort in producing the reductant bed and associated cost savings, but also in that it provides a means whereby catalytic activity may be returned to a packing in which the catalyst coating is removed or coated over. Thus, the bed can be regenerated and rejuvenated before exhaustion of the reductant metal.

Other configurations for passing the stream through a column containing a large excess of reductant are shown in FIGS. 3 and 4. In FIG. 3 the column 34 contains a bed 42 of metal wool such as steel wool having a coating of catalyst metal. Other permeable catalytic reductant metal masses for the bed can be fabricated from honeycomb metal, filamentary metal, sponge metal or other structure having free flow and high surface area.

In the embodiment of FIG. 4, the flow controlled stream 50 is pumped by means of pump 53 into the bottom inlet 52 of the column 34. The upwardly directed flow from distribution manifold 60 forms a fluidized bed 54 of particulate metal reductant. A perforated screen, slit or perforated plastic dome 84 or solid entrainer with recycle can be utilized to retain the reductant particles within column 34. The treated stream leaves through outlet 56. In all embodiments, flow is adjusted so that retention time is adequate for the desired treatment.

By operating at a pH above 6, usually 6.5 to 7.5 consumption of reductant is significantly reduced and degradation still proceeds at efficient rate. Reaction effectiveness decreases at pH values in excess of about 8. At acid pH of 1.5 to 4 consumption of reductant is excessive and excessive hydrogen generation can lead to the production of a potentially explosive environment in the presence of air. It was previously believed that a low acid pH was necessary for effective reduction of the stable halogenated hydrocarbon. However, it is now found that the large excess of metal reductant provides an adequate reaction rate at neutral pH.

Examples of practice follow:

EXAMPLE 1

An iron-copper couple was formed by adding an aqueous solution of cupric chloride to an aqueous suspension of sponge iron powder. Copper addition was in the amount of 1 meq per gram of iron. The usual grey color of the iron immediately darkened to a black to brown appearance indicating copper precipitation on the iron particles. The filtered and dried iron-copper couple was then added to washed white No. 30, fine filter sand (30–42 mesh, 56% 420 micrometers in diameter) and mixed to form a reductant mixture (18.3% Fe-Cu, 81.7% sand). The mixture was placed in an 8 cm×30 cm long glass tube, fitted with a bottom drain covered with dacron mesh, and glass wool to contain the column packing. Chlordane waste water, analyzing 25.5 $\mu$g/l chlordane, was adjusted from initial pH 8.4 to 7.0 and passed through the column. The effluent from the column did not show any of the principal components of chlordane at the limits of detection (<0.1 $\mu$g/l).

Toxaphene waste, filtered to remove the suspended particles, and adjusted from an initial pH of 11.5 to 7.0 was passed through the same reductive bed. The toxaphene solution analyzing 4.1 mg/l when passed through the reductor bed gave effluent analyzing from 3.6 $\mu$g/l down to detection limits (~0.5 $\mu$g/l).

In another test with the same reductor column, aqueous solutions of endrin, heptachlor, and hexachlorocyclopentadiene were prepared by adding an acetone solution of the toxicant to water to prepare a 30 $\mu$g/l solution, adjusting the pH to 7.0. The three toxicant solutions were passed through the column separately. With the endrin test, there was no evidence of endrin (<0.1 $\mu$g/l endrin) in any of the effluent fractions, although the analytical record did indicate unknown degradation products. Similar results were obtained with heptachlor and hexachlorocyclopentadiene. The toxicant was not present in the effluent at detection limits (<0.1 $\mu$g/l).

EXAMPLE 2

An iron-copper couple was formed in the same manner as Example 1 by adding 1 meq aqueous CuSO$_4$ per gram of iron powder, filtering and drying the iron-copper couple. The same black to brown color was produced when the couple was formed as in the preceeding example. The reductor column was formed by mixing the iron-copper couple with No. 30 sand in the same ratio as the preceeding example, and placing in a 3.6 cm dia tube to a depth of 155 cm. The tube was fitted with a drain cock and a mat of glass wool to hold the packing in place. An aqueous 100 $\mu$g/l carbon tetrachloride solution was prepared, adjusted to pH 7.2 and passed through the column. No detectable carbon tetrachloride was found in the effluent, on analysis of the solution. Similar tests were carried out with chloroform (113 $\mu$g/l), dichloromethane (183 $\mu$g/l) and bromochloromethane (173 $\mu$g/l). In none of these tests were detectable amounts of the toxicant found in the effluent (<1 $\mu$g/l).

EXAMPLE 3

An iron-copper couple was formed in the same manner as Example 1 by adding 0.1 meq aqueous CuSO$_4$ per gram of iron powder, filtering and drying the iron-copper couple; the same black to brown color was produced when the couple was formed as in preceeding examples. The reductor column was formed by mixing 12.3% iron-copper couple with 87.7% No. 30 sand and placing in a 3.7 cm dia column to a depth of 163 cm; the tube holding the bed was again terminated with a stop cock and the bed was supported on glass wool. An aqueous solution of a polychlorinated biphenyl was prepared by adding Aroclor 1242 (a polychlorinated biphenyl containing ~42% by weight chlorine) to water to prepare a 250 $\mu$g/l solution. The solution of pH 7.2 was passed through the column and the effluent analyzed. The effluent analyzed 0.1 to 1.5 $\mu$g/l of chlorinated biphenyls. Similar results were obtained with two other chlorinated biphenyls: Aroclor 1254 (~54 wt % chlorine), 43 $\mu$g/l solution, and Aroclor 1221 (~21 wt % chlorine), 343 $\mu$g/l solution. The effluent samples from the Aroclor 1254 test analyzed ~0.1 $\mu$g/l chlorinated biphenyls, and the Aroclor 1221 <10 $\mu$g/l.

EXAMPLE 4

A reduction column was prepared by mixing aluminum-copper alloy powder with No. 30 sand in the same ratio as Example 1 and placing in a 4.6 cm dia tube to a depth of 30 cm. The aluminum-copper alloy contained 5.4% copper and had an average dia of 18 micrometers. The tube was again terminated with a stop cock and the packing was supported on a mat of glass wool. An aqueous solution containing 30 $\mu$g/l heptachlor was prepared, the pH was adjusted to 7.1, and the solution passed through the column. Effluent samples analyzed 0.05 $\mu$g/l and lower. In a similar test when 30 $\mu$g/l aqueous endrin was passed through the column, the analysis of the effluent showed endrin to be absent at the sensitivity of analysis (<0.1 $\mu$g/l).

EXAMPLE 5

Similar tests were carried out in which aluminum-copper alloy and zinc-copper couple were used for the reduction of polychlorinated biphenyls (PCBs). A reductive column was prepared by blending 21.8% aluminum-copper alloy (same alloy as Example 4) and 78.2% No. 30 sand in the same manner as Example 4, except that the bed depth was 160 cm. A solution of Aroclor 1016 (~42 wt % Cl) containing 200 $\mu$g/l of the toxicant was neutralized to pH 7.0 and passed through the column. The effluent when analyzed showed substantial degradation; materials which may be products or unreacted PCB analyzed about 15 µg/l or less. In a similar test with zinc-copper couple as the reductant, technical zinc powder was suspended in water and aqueous copper sulfate solution added to make the couple. Copper addition was in the amount of 1 meq per gram of zinc. The usual grey color of the zinc immediately darkened to a black to brown appearance indicating copper precipitation on the zinc particles. The zinc-copper couple was filtered and dried and mixed (21.8%) with 78.2% sand to form the reductive column. The bed depth was 160 cm and the column was prepared in the same manner as the other reductor beds in the preceeding Examples. Passage of aqueous, pH 7, 200 µg/l Aroclor 1016 through the bed again led to substantial degradation with the analysis showing material which may be products or partially degraded components of Aroclor 1016 at less than 100 µg/l; the principal components of Aroclor 1016 were <2 µg/l.

EXAMPLE 6

Iron-copper couple was prepared in the same manner as described in Example 1, and was mixed with No. 30 sand to give a bed containing 7.7% iron-copper and 92.3% sand. The column diameter was 2.5 cm and the bed depth 13.5 cm. The column was prepared similar to Example 1. In one test, toxaphene at pH 2.4 was passed through the column. The effluent analyzed 1.1 µg/l toxaphene, while the copper in the effluent was 0.30 to 0.37 mg/l and the iron 118 to 143 meg/l. Raising the pH to 4.1 gave an effluent ranging from 3.7 to 9.0 µg/l toxaphene with an iron analysis of 3.4 to 5.3 mg/l and copper analysis of 0.01 mg/l. Raising the pH to 6.9 reduced the iron consumption to 1.1 to 3.3 mg/l. Essentially complete degradation of the toxaphene was achieved.

In a similar test, chlordane manufacturing plant waste was passed through a 3.6 cm dia×30 cm deep iron-copper sand bed. The column contained the same mixture as described in Example 1. Four tests were made. In one the pH of the influent was adjusted to 4.0, in a second test 6.0, 7.0 in the third test, and 8.0 in the fourth. In all of these tests, the waste, which analyzed 25.5 µg/l chlordane, was degraded so that none of the principal components of chlordane was present at detection limits (~0.1 µg/l or less). The iron and copper consumption was as follows:

| Initial pH | Metal Consumption, mg/l | |
| --- | --- | --- |
|  | Iron | Copper |
| 4.0 | .21–36 | 0.24–0.30 |
| 6.0 | 2.8–4.2 | 0.11–0.14 |
| 7.0 | 1.6–5.4 | 0 |
| 8.0 | 6.0–7.7 | 0.01 |

EXAMPLE 7

An iron-cobalt couple was formed in the same manner as the iron-copper material by suspending iron powder in water and adding dropwise cobaltous chloride solution; the iron changed in appearance from grey to a black to brown color as the cobalt precipitated on the surface of the iron. Cobalt addition was in the amount of 1 meq per gram of iron. The iron-cobalt couple was filtered and dried and mixed (21.8%) with No. 30 sand (78.2%) and placed into a tube to give a reductor bed about 60 cm deep. A 200 µg/l aqueous solution of Aroclor 1016 (a polychlorinated biphenyl, ~42% chlorine) at pH 7.0 was passed through the column and the effluent analyzed. All components were reduced significantly. The less biodegradable trichloro- and tetrachlorobiphenyls were reduced to 0.1 µg/l or less, and the biodegradable mono- and dichloro-biphenyls were significantly degraded. Similar results were obtained with iron-nickel reductant, prepared by adding nickelous sulfate to iron powder, and iron-silver couple, prepared by adding aqueous silver nitrate to iron powder suspended in water. With both the iron-nickel and iron-silver systems, 1 meq of catalyst metal was used per gram of iron, and in each case in preparing the material, the iron turned from a grey color to a darker black or dark grey as the catalyst metal deposited on the iron particles.

EXAMPLE 8

A reductive column without the sand diluent was prepared by applying copper catalyst to the surface of fine steel wool, and placing the resultant coated steel wool in a glass column equipped with a stop cock drain. Steel wool balls were cleaned and dipped in copper sulfate solution (1 meq copper per gram of iron) washed, and packed into an 4.7 cm glass pipe to a depth of 95 cm. When an endrin-heptachlor containing waste was passed through the tube, the endrin was reduced from 300 µg/l to 0.17 µg/l or less, and the heptachlor from 30 µg/l to 0.40 to 1.0 µg/l.

EXAMPLE 9

A reductive column without the sand diluent was prepared by pumping the waste solution to be treated into the bottom of a tube containing iron-copper reductant, adjusting the flow rate so that the iron-copper bed is expanded about two- to three-fold. In a test in which 1 kg of fine powder (Anchor B, ca 5–10 micrometer dia) was catalyzed with 1 meq copper per gram, the iron-copper reductant was placed in a 4.7 cm dia tube 120 cm long, giving an unexpanded bed depth of 35 cm. An aqueous pH 7.0 endrin-heptachlor solution was pumped into the bottom of the tube, with the treated solution overflowing the tube. The flow rate was adjusted so that the bed was expanded to 100 to 110 cm. In this test heptachlor was reduced from 30 µg/l to detection limits (~0.03 µg/l), and endrin from 300 µg/l to 0.03 to 2.6 µg/l.

EXAMPLE 10

Column generation of iron-copper couple has been achieved in tests in which iron and sand were blended and the copper solution was allowed to percolate through the bed. In a test, No. 30 sand (77.1%), iron powder (21.8%) and calcium carbonate, added as an acid scavenger (1.1%) were blended and placed into a 3.7 cm dia×180 cm tube fitted with a glass wool mat to hold the packing, and a stop cock drain. The iron-sand-calcium carbonate blend was poured into the column to a depth of 25–30 cm and dilute (~0.05N) aqueous copper sulfate solution added to fill the voids in the blend. Another 25–30 cm of the blend was added, and the dilute copper sulfate solution was again added to fill the voids in the packing. This procedure was repeated until a bed depth of 145 cm was reached. The spent copper sulfate-iron sulfate solution was then washed out, and an aqueous endrin-heptachlor (pH 7.0) solution passed through the column. The analysis of the effluent showed that the heptachlor was reduced from 1300 μg/l to detection limits (~0.02 μg/l), and the endrin from 700 μg/l to detection limits (~0.03 μg/l).

EXAMPLE 11

A reductive column without the sand diluent was prepared by pumping the waste solution to be treated into the bottom of a tube containing iron-copper (1.55%)-nickel (1.75%) alloy reductant, and adjusting the flow rate so that the alloy powder bed is expanded about two-to three-fold. In a test in which 2 kg of the alloy which was larger than 200 mesh (particles approximately 74 to 150 micrometers diameter) was placed in a 3.7 cm. diameter tube, the bed was expanded from 70 cm. depth to 190 to 200 cm. by a 1 liter/min. upward flow through the bed of an aqueous solution of toxicant.

When an aqueous 100 mg/l Aroclor 1016 solution (a polychlorinated biphenyl containing about 42 wt % chlorine) at pH 7.0 was passed through the reactor, the polychlorinated biphenyl was reduced to 8.9 mg/l by the first pass, and to detection limits for the varied chlorinated biphenyl components (approximately 1 μg/l) on a subsequent pass.

In another test with pH 7.0, 25 mg/l, aqueous atrazine solution (2-chloro-4-ethylamino-6-isopropylamino-s-triazine), the effluent analyzed 2.4 mg/l of the atrazine.

The fluidized bed reactor has also been operated on a larger scale with a 6-in. diameter fluidized bed containing approximately 30 kg of the approximately 74 to 150 micrometer diameter, iron-copper-nickel alloy reductant powder. In a test in which 100 μg/l aqueous chloroform solution was passed through the reactor at flow rates of about 3 gallons per minute, the chloroform in the effluent was reduced to about 1 μg/l or less.

EXAMPLE 12

The non-halogenated species p-nitrophenol was also shown to be effectively reduced by the reductive column. A test was made in which a 1 mg/l solution of p-nitrophenol in water at pH 7.0 was passed through the fluidized-bed reactor described in Example 11. The reactor again contained 2 kg of the iron-copper-nickel alloy and the upward flow of the waste solution through the reactor was approximately 1 liter/min. Passage of the 1 mg/liter p-nitrophenol through the reactor yielded an effluent with an average assay of 0.014 mg/l p-nitrophenol, and a second pass through the reactor further reduced the nitrophenol to an assay of 0.0016 mg/liter. The influent p-nitrophenol was a brilliant yellow color, while the reactor effluent was water-white. Neither phenol nor aniline appeared as a reaction product.

EXAMPLE 13

The reportedly carcinogenic toxicant, N-nitrosodimethylamine, (also known as dimethylnitrosamine) has been shown to be effectively reduced in aqueous solution by the catalyzed iron reductant in the fluidized bed reactor. This toxicant is non-chlorinated. A test was made in which a 1 mg/liter aqueous solution of the N-nitrosodimethylamine at pH 7.0 was passed through the fluidized bed reactor of Example 11. The reactor again contained 2 kg of the coarser than 200 mesh (74 micrometer diameter) iron-copper-nickel alloy, and the upward flow of the toxicant solution was at a nominal 1 liter/min. Passage of the N-nitrosodimethylamine solution through the reductor bed gave an effluent which on analysis showed no detectable amount of the N-nitrosodimethylamine (detection limit about 1 μg/l). The potential product N, N-dimethylamine was also absent.

A full scale unit containing 4-25 gpm 36" diameter columns containing catalyzed iron diluted with sand has been constructed in which the columns can be run in series, parallel or a combination of 2 series columns in parallel. Field tests show that pesticide waste streams containing up to 500 ppb of chlorinated hydrocarbon can be treated to reduce the pesticide level to as low as 0.01 ppb at flow rates up to 100 gpm which is well below 1978 U.S. federal standards.

The major expected application of the invention is in the treatment of waste streams containing dissolved chlorinated hydrocarbon pesticide toxicant though the invention is also useful in the treatment of suspended toxicant not removed by filtration and in the treatment of industrial streams in which the toxicant is associated with suspended solids. The application to chlorinated industrial wastes has also been shown in studies with polychlorinated biphenyls, and the process should also be applicable to other chlorinated hydrocarbon oils and solids dissolved or suspended in water.

Another important application of the process is the treatment of streams containing reportedly carcinogenic light-ends such as chloroform, carbon tetrachloride, ethylene dichloride and related organohalogen compounds of waste waters containing these materials.

Since the discovered catalyzed reductant system is effective for the degradation of a variety of chemically stable chlorinated hydrocarbons, such as the polychlorinated biphenyls, and the cyclodiene pesticides (aldrin, dieldrin, endrin, etc.), as well as nitrophenol, nitrosamines and triazines, the application to other classes of compounds is expected to be achievable. Reduction of phosphorous pesticides, reduction of other nitrogen groups such as cyanide ion, cyanate ion, thiocyanate ion, ureas, carbamates, and amines, and the reduction of sulfur compounds in pesticides and related industrial materials all appear possible.

It is to be realized that only preferred embodiments of the invention have been described and that numerous substitutions, modifications and alterations are permissible without departing from the spirit and scope of the invention as defined in the following claims.

What is claimed is:

1. A method of treatment of an aqueous stream containing below 100 ppm of reducible organic compounds selected from halogenated organic compounds, nitrogen containing organic compounds or hydroxyl containing organic compounds to produce an effluent stream containing 90% less of the compounds than the aqueous stream and containing a low level of metal ions comprising the steps of:

adjusting the pH of the stream to between 6 and 8;

flowing the stream through a permeable bed comprising 5 to 40% by weight of particulate, elemental metal reductant capable of reduction of said organic compounds, the remainder of said bed being finely divided, inert filter and the ratio of reductant to compound within said bed is at least 1000:1 and said metal reductant consisting of essentially a first metal selected from iron, aluminum, zinc, magnesium or cadmium and 0.1 to 10 meq per gram of reductant of at least one catalytic metal selected from copper, silver, cobalt or nickel;

reductively reacting the compounds with the reductant to produce said effluent stream; and removing the effluent stream from the bed.

2. A method according to claim 1 in which the compound is a soluble organic compound.

3. A method according to claim 2 in which the compound is selected from halogenated hydrocarbons, nitrosamines, phenols, nitrophenols and triazines.

4. A method according to claim 3 in which the compound is a halogenated hydrocarbon which is a stable pesticide.

5. A method according to claim 4 in which the pesticide is selected from aromatic and cycloaliphatic chlorinated hydrocarbons.

6. A method according to claim 3 in which the halogenated hydrocarbon is a polychlorinated biphenyl.

7. A method according to claim 3 in which the halogenated hydrocarbon is an aliphatic hydrocarbon containing 1 to 10 carbon atoms and 1 to 8 chlorine atoms.

8. A method according to claim 1 in which the compound is present in the aqueous stream in an amount below 1 ppm and the effluent stream contains less than 1 ppb of the compound.

9. A method according to claim 1 in which the metal reductant particles have a diameter from 5 to 500 micrometers.

10. A method according to claim 1 in which the catalytic metal is applied to the surface of the metal reductant particles in situ within the bed by passing a salt solution of the catalytic metal through the bed and electrochemically displacing reductant metal atoms from the surface of the particles with catalytic metal atoms.

11. A method according to claim 10 in which the reductant-catalyst couple is iron-copper.

12. A system for treatment of aqueous streams containing less than 100 ppm of reducible organic compounds selected from halogenated organic compounds, nitrogen containing organic compounds or hydroxyl containing organic compounds to produce an effluent stream containing a significantly lower level of the compounds and a low level of metal ions comprising:
a source of said stream;
a column having an inlet for receiving a flow of said stream and an outlet for removing said effluent;
flow means connecting said source to said inlet for flowing said stream through said column; said flow means including pH control means for controlling the pH of said stream to a selected pH between 6 and 8; and
a permeable bed comprising 5% to 40% by weight of particulate, elemental metal reductant capable of reductive reaction with said organic compounds and the remainder of said bed being finely divided, inert filler, said metal reductant consisting of a first metal selected from iron, aluminum, zinc, magnesium or cadmium and 0.1 to 10 meq per gram of reductant of at least one catayatic metal selected from copper, silver, cobalt or nickel, said bed being constrained within said column between said inlet and outlet in which the ratio of reductant to compound is at least 1000:1 for reductive degradation of said compound to form an effluent leaving said outlet containing a significantly reduced level of compound.

13. A system according to claim 12 in which the control means includes a source of pH adjusting liquid, a metering pump connected to said source and to an inlet line, a pH sensor disposed in the inlet line to the column for sensing the pH of the stream and generating a signal and control means for receiving said signal and for actuating said pump to inject a controlled amount of pH adjusting medium into said line.

14. A system according to claim 13 in which the flow means further includes filter means.

15. A system according to claim 14 in which the flow means further includes pump means for pumping the stream through the column.

16. A system according to claim 15 in which the bed further includes retaining means for retaining said particles within the column.

17. A system according to claim 16 in which the column further includes distribution means for distributing the stream over the top surface of the bed and multiple collection means disposed under the bed for collecting the treated stream.

18. A system according to claim 12 in which the diameter of the particles is from 5 to 500 micrometers.

19. A system according to claim 12 in which the bed includes filamentary, elemental metal reductant.

* * * * *

UNITED STATES PATENT AND TRADEMARK OFFICE
CERTIFICATE OF CORRECTION

PATENT NO. : 4,219,419
DATED : August 26, 1980
INVENTOR(S) : Keith H. Sweeny

It is certified that error appears in the above-identified patent and that said Letters Patent are hereby corrected as shown below:

Column 1, line 52 change "nitros amines" to --nitrosoamines--.

Column 2, line 40 change "Zn. Cu" to --Zn· Cu--.

Column 3 line 5 change "Fe. Cu" to --Fe· Cu--.

Column 3 line 47 change "PPT" to --DDT--.

Claim 1 (Column 12 line 60) change "filter" to --filler--.

Signed and Sealed this

Thirteenth Day of January 1981

[SEAL]

Attest:

SIDNEY A. DIAMOND

Attesting Officer  Commissioner of Patents and Trademarks